(12) United States Patent
Kim et al.

(10) Patent No.: US 10,110,843 B2
(45) Date of Patent: Oct. 23, 2018

(54) IMAGE DISPLAY DEVICE AND OPERATING METHOD OF THE SAME

(71) Applicant: Samsung Electronics Co., Ltd., Suwon-si (KR)

(72) Inventors: Byuk-sun Kim, Seoul (KR); Kyoung-jae Park, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/890,604

(22) Filed: Feb. 7, 2018

(65) Prior Publication Data
US 2018/0249112 A1    Aug. 30, 2018

(30) Foreign Application Priority Data

Feb. 24, 2017    (KR) .................. 10-2017-0025046

(51) Int. Cl.
*H04N 5/44* (2011.01)
*H04N 5/445* (2011.01)
(Continued)

(52) U.S. Cl.
CPC .......... *H04N 5/4403* (2013.01); *G08C 19/28* (2013.01); *H04N 5/44513* (2013.01);
(Continued)

(58) Field of Classification Search
CPC ............... H04N 5/4401; H04N 5/4403; H04N 5/44513; H04N 5/44543;
(Continued)

(56) References Cited

U.S. PATENT DOCUMENTS 6,008,735 A     12/1999 Chiloyan et al.
8,904,418 B1 *  12/2014 Rowe ............... H04N 21/44222
                                                           725/105
(Continued)

FOREIGN PATENT DOCUMENTS

EP          3193497         7/2017
KR   10-2003-0044738        6/2003
(Continued)

OTHER PUBLICATIONS

Extended European Search Report dated Jul. 20, 2018 in European Patent Application No. 18155618.4.
International Search Report and Written Opinion of the International Searching Authority dated Jun. 14, 2018 in International Patent Application PCT/KR2018/001854.

*Primary Examiner* — Sherrie Hsia
(74) *Attorney, Agent, or Firm* — Staas & Halsey LLP

(57) ABSTRACT

An image display device includes: a display; and a controller configured to classify a plurality of remote control code sets which are stored in a storage into at least one group based on a control signal included in the plurality of remote control code sets, to select one of the at least one group, to transmit a control signal included in the selected group to a peripheral device connected to the image display device through a communicator, to control the display to display an image received from the peripheral device in response to the control signal, to extract peripheral device information included in the image, and to determine a remote control code set corresponding to the peripheral device based on the peripheral device information.

20 Claims, 14 Drawing Sheets

(51) Int. Cl.
*G08C 19/28* (2006.01)
*G08C 17/02* (2006.01)
*G08C 23/04* (2006.01)

(52) U.S. Cl.
CPC ............. *G08C 17/02* (2013.01); *G08C 23/04* (2013.01); *G08C 2201/92* (2013.01); *H04N 2005/4432* (2013.01); *H04N 2005/44534* (2013.01)

(58) Field of Classification Search
CPC . H04N 2005/4432; H04N 2005/44534; H04N 21/4622; H04N 21/482; G08C 19/28; G08C 17/02; G08C 23/04; G08C 2201/92
USPC ................ 348/734, 725; 725/37, 59–61; 340/12.22, 12.23, 12.25, 12.26, 12.37, 340/12.52, 12.53
IPC ............................................... H04N 5/44,5/445
See application file for complete search history.

(56) References Cited

U.S. PATENT DOCUMENTS

| | | |
|---|---|---|
| 2003/0071927 A1 | 4/2003 | Park et al. |
| 2012/0319942 A1 | 12/2012 | Kim et al. |
| 2013/0271659 A1 | 10/2013 | Na et al. |
| 2014/0139749 A1 | 5/2014 | Kim et al. |
| 2014/0154522 A1 | 6/2014 | Gerritsen |
| 2015/0179061 A1 | 6/2015 | Kim et al. |
| 2017/0195609 A1 | 7/2017 | Kim et al. |

FOREIGN PATENT DOCUMENTS

| | | |
|---|---|---|
| KR | 10-2014-0037067 | 3/2014 |
| KR | 10-1560314 | 10/2015 |
| KR | 10-2017-0081953 | 7/2017 |
| WO | 2015/072665 | 5/2015 |

* cited by examiner

FIG. 10

| GROUP | | PERIPHERAL DEVICE INFORMATION (MANUFACTURER, BUSINESS NAME, LOGO, ETC.) | NUMBER OF CONTROL SIGNALS INCLUDED IN REMOTE CONTROL CODE SETS | PRIORITY BASED ON USAGE FREQUENCY |
|---|---|---|---|---|
| GROUP A | (A-1) | COMPANY T, T | 30 | FIRST |
| | (A-2) | COMPANY H, H | 35 | |
| | (A-3) | COMPANY B, B | 33 | |
| GROUP B | (B-1) | COMPANY B, C | 40 | SECOND |
| | (B-2) | COMPANY V, V | 43 | |
| GROUP C | (C-1) | COMPANY D, D | 22 | THIRD |
| | (C-2) | COMPANY A, A | 20 | |
| | (C-3) | COMPANY I, I | 23 | |

IMAGE DISPLAY DEVICE AND OPERATING METHOD OF THE SAME

CROSS-REFERENCE TO RELATED APPLICATIONS

This application is based on and claims priority under 35 U.S.C. § 119 to Korean Patent Application No. 10-2017-0025046, filed on Feb. 24, 2017, in the Korean Intellectual Property Office, the disclosure of which is incorporated by reference herein in its entirety.

BACKGROUND

1. Field

The present disclosure relates to an image display device and a method of operating the same, and more particularly, to an image display device for setting an integrated remote controller for controlling peripheral devices connected to the image display device, and a method of operating the image display device.

2. Description of the Related Art

An image display device is a device having a function of displaying an image that a user can view. A user can view a broadcast through the image display device. The image display device displays a broadcast, which is selected by the user from among broadcast signals transmitted from a broadcast station, on a display.

Also, provided is a smart television (TV) providing various content in addition to a broadcasting function. The smart TV is capable of analyzing and providing what a user desires without a user's operation, rather than being manually operated according to a user's selection.

Meanwhile, when peripheral devices such as a Blu-ray disc player, a set-top box, a Digital Versatile Disk (DVD) player, a streaming device, a home theater, and an audio device are connected to the image display device such as a TV, a user can control various devices with a single remote controller, that is, an integrated remote controller.

Recently, there is increasing demand for research into a method of setting the integrated remote controller more efficiently is demanded.

SUMMARY

Provided are an image display device for setting an integrated remote controller for controlling peripheral devices connected to an image display device, and a method of operating the image display device.

Additional aspects will be set forth in part in the description which follows and, in part, will be apparent from the description, or may be learned by practice of the presented example embodiments.

According to an aspect of an example embodiment, an image display device includes: a storage configured to store a plurality of remote control code sets; a communicator configured to communicate with at least one peripheral device; a display; and a controller configured to classify the plurality of remote control code sets into at least one group based on a control signal included in the plurality of remote control code sets, to select one of the at least one group, to transmit a control signal included in the selected group to a peripheral device connected to the image display device through the communicator, to control the display to display an image received from the peripheral device in response to the control signal, to extract peripheral device information included in the image, and to determine a remote control code set corresponding to the peripheral device based on the peripheral device information.

According to an aspect of another example embodiment, a method of operating an image display device includes: classifying a plurality of remote control code sets stored in the storage into at least one group based on a control signal included in the plurality of remote control code sets; selecting one of the at least one group; transmitting a control signal included in the selected group to a peripheral device connected to the image display device; displaying an image received from the peripheral device in response to the control signal; extracting peripheral device information included in the image; and determining a remote control code set corresponding to the peripheral device based on the peripheral device information.

According to an aspect of another example embodiment, a non-transitory computer-readable recording medium having recorded thereon a computer program performs the above-described method.

BRIEF DESCRIPTION OF THE DRAWINGS

These and/or other aspects will become apparent and more readily appreciated from the following description of the example embodiments, taken in conjunction with the accompanying drawings in which:

FIG. 10 is a view for explaining an example of information stored corresponding to a plurality of remote control code sets, according to an example embodiment;

DETAILED DESCRIPTION

Figure 1:
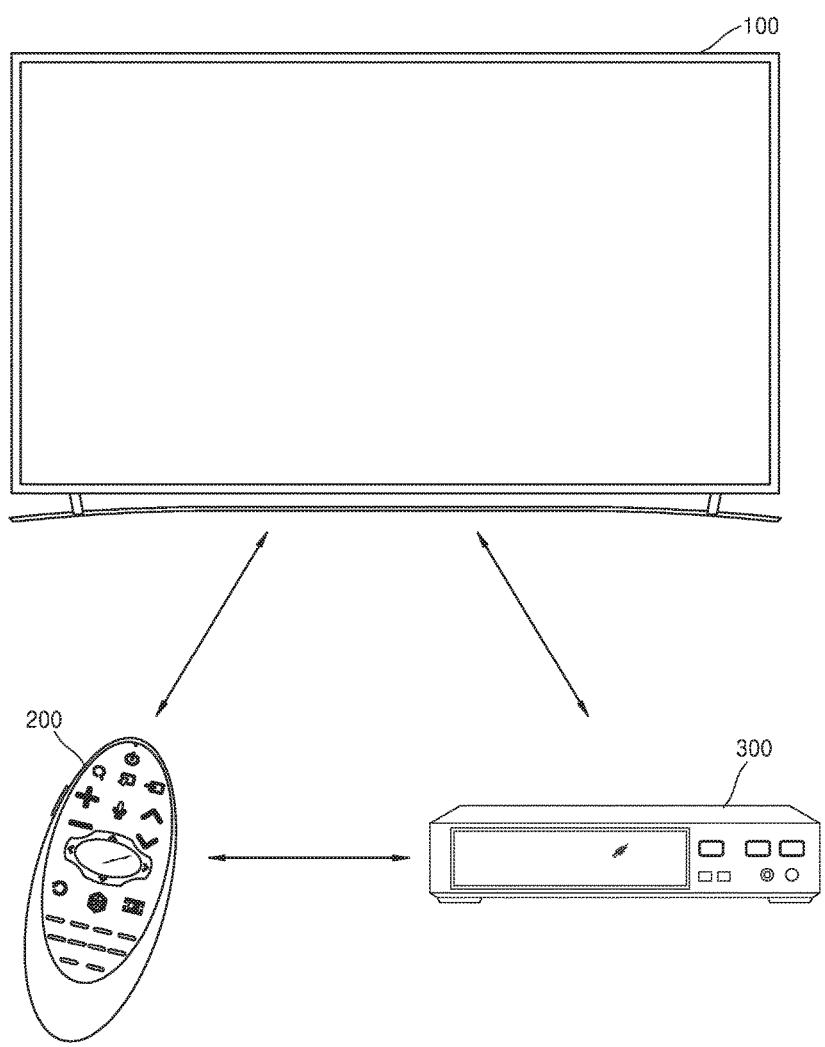
FIG. 1 is a view of an image display device, a control device, and a peripheral device, according to an example embodiment.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

General and widely used terms have been employed herein, in consideration of functions provided in the disclosure, and may vary according to an intention of one of ordinary skill in the art, a precedent, or emergence of new technologies. Additionally, in some cases, an applicant may arbitrarily select specific terms, in which case, the applicant will provide the meaning of the terms in the description of the embodiments. Accordingly, it will be understood that the terms used herein should be interpreted as having a meaning that is consistent with their meaning in the context of the relevant art and will not be interpreted in an idealized or overly formal sense unless expressly so defined herein.

Throughout the specification, when a portion "includes" an element, another element may be further included, rather than excluding the existence of the other element, unless otherwise described. In addition, terms such as " . . . unit", " . . . module", or the like refer to units that perform at least one function or operation, and the units may be implemented as hardware or software or as a combination of hardware and software.

The disclosed example embodiments will be described with reference to the accompanying drawings in such a manner that the example embodiments may be easily carried out by those of ordinary skill in the art. In this regard, the present disclosure may have different forms and should not be construed as being limited to the descriptions set forth herein. In addition, descriptions of well-known functions and constructions will be omitted for clarity and conciseness, and similar reference numerals are assigned to similar elements throughout the specification.

FIG. 1 is a view of an image display device 100, a control device 200, and a peripheral device 300, according to an example embodiment.

As illustrated in FIG. 1, the image display device 100 may be a television (TV), but this is merely an example and may be implemented in an electronic device including a display. For example, the image display device 100 may be realized as various electronic devices such as a cellular phone, a tablet personal computer (PC), a digital camera, a camcorder, a laptop computer, a desktop computer, an e-book terminal, a terminal for digital broadcasting, a personal digital assistant (PDA), a portable multimedia player (PMP), a navigation, an MP3 player, and a wearable device. In particular, example embodiments may be easily implemented in a display device having a large display such as a TV, but the present disclosure is not limited thereto.

In addition, the image display device 100 may be a fixed type or a mobile type, and may be a digital broadcasting receiver capable of receiving digital broadcasting. Furthermore, the image display device 100 may be implemented not only as a flat display device but also as a curved display device having a screen with a curvature or a flexible display device capable of adjusting a curvature. An output resolution of the image display device 100 may include, for example, High Definition (HD), Full HD, Ultra HD, or a clearer resolution than the Ultra HD.

The peripheral device 300 according to an example embodiment may be a reproducing device that reproduces multimedia content. For example, the peripheral device 300 may include a Blu-ray Disc player, a set-top box, a Digital Versatile Disk (DVD) player, a streaming device, a home theater, an audio device, and the like. Alternatively, the peripheral device 300 may be implemented as various electronic devices such as a smart phone, a tablet PC, a mobile phone, a videophone, an e-book reader, a desktop PC, a laptop PC, a netbook computer, a PDA, a PMP, an MP3 player, a wearable device, and the like.

The image display device 100 and the peripheral device 300 according to an example embodiment may transmit and receive data, signals, and the like using wired/wireless communication. For example, the peripheral device 300 may transmit an image signal to the image display device 100, and the image display device 100 may display an image based on the received image signal.

The control device 200 according to an example embodiment may be implemented as various types of devices for controlling the image display device 100 such as a remote control or a cellular phone. The control device 200 according to an example embodiment may control the image display device 100 using a remote control code set of the image display device 100. The remote control code set according to an example embodiment may be an IR key code set.

In addition, the control device 200 according to an example embodiment may be configured as an integrated remote controller to control the peripheral device 300 as well as the image display device 100. For example, the control device 200 may store a remote control code set corresponding to the peripheral device 300, and may control the peripheral device 300 using a remote control code set corresponding to the peripheral device 300.

In addition, the control device 200 may control the image display device 100 and the peripheral device 300 using short-range communication including infrared or Bluetooth. The control device 200 may control functions of the image display device 100 and the peripheral device 300 using at least one of a key (including a button), a touch pad, a microphone (not shown) capable of receiving user's voice, and a sensor (not shown) capable of motion recognition of the control device 200 that are provided in the control device 200.

According to an example embodiment, the control device 200 may include a power on/off button for turning on or off the image display device 100 and the peripheral device 300. The control device 200 may also change channels of the image display device 100 and the peripheral device 300, adjust volume, select a terrestrial broadcast/cable broadcast/satellite broadcast, or set an environment by a user input.

In example embodiments of the specification, the term "user" refers to a person who controls functions or operations of the image display device 100 or the peripheral device 300 using the control device 200, and may include a viewer, a manager, or an installer.

Meanwhile, according to an example embodiment, the image display device 100 may determine a remote control code set corresponding to the peripheral device 300 by transmitting a control signal to the peripheral device 300 and analyzing an image received from the peripheral device 300. The image display device 100 may reduce the total number of transmission of the control signal by classifying remote control code sets including a common control signal among a plurality of remote control code sets stored in a storage 140 into a group. Also, time for the image display device 100 to determine a remote control code set corresponding to the peripheral device 300 may be reduced.

Figure 2:
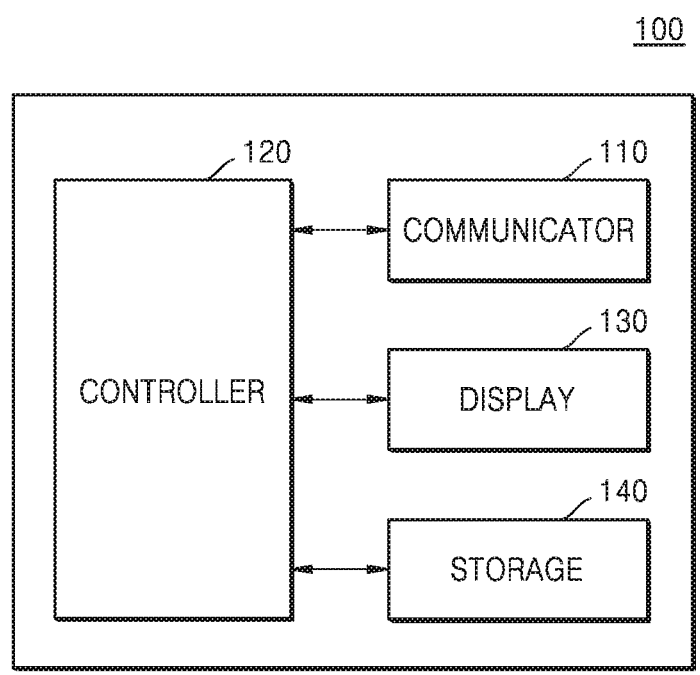
FIG. 2 is a block diagram of a configuration of an image display device according to an example embodiment.

FIG. 2 is a block diagram of a configuration of the image display device 100 according to an example embodiment.

Referring to FIG. 2, the image display device 100 according to an example embodiment may include a communicator 110, a controller 120, a display 130, and the storage 140.

The communicator 110 may transmit and receive data or signals to/from an external device (for example, a control device, a peripheral device, etc.) under the control of the controller 120.

The communicator 110 may transmit and receive data or signals in at least one of a wireless Local Area Network (LAN) (for example, Wireless-Fidelity (Wi-Fi)), Bluetooth, wired Ethernet, infrared (IR), and Bluetooth Low Energy (BLE), ultrasound, Zigbee, High Definition Multimedia Interface (HDMI), and HDMI-Consumer Electronic Control (CEC) according to performance and a structure of the image display device 100.

The communicator 110 according to an example embodiment may transmit a control signal for controlling the peripheral device 300 to the control device 200 or the peripheral device 300 under the control of the controller 120.

In addition, the communicator 110 according to an example embodiment may receive an image signal from the peripheral device 300. For example, the peripheral device 300 may generate an image signal corresponding to the control signal in response to a control signal received from the control device 200 or the image display device 100, and may transmit the generated image signal to the image display device 100 through an HDMI cable. However, the present disclosure is not limited thereto.

Furthermore, the communicator 110 may transmit a remote control code set corresponding to the peripheral device 300 to the control device 200.

The controller 120 may control the image display device 100 by a user command or an internal program.

The controller 120 according to an example embodiment may control the communicator 110 to transmit a control signal for controlling the peripheral device 300 to the control device 200 or the peripheral device 300. The control signal for controlling the peripheral device 300 may be a signal for displaying an image including peripheral device information on the display 130.

The controller 120 according to an example embodiment may classify a plurality of remote control code sets stored in the storage 140 into at least one group based on a control signal included in the plurality of remote control code sets. The controller 120 may classify a plurality of remote control code sets including a common control signal into one group.

The controller 120 may select one of groups based on usage frequency information of the group.

The controller 120 may transmit a control signal included in the selected group to the peripheral device 300 connected to the image display device 100. The controller 120 may transmit a common control signal included in the plurality of remote control code sets of the selected group to the peripheral device 300. Also, the controller 120 may select a remote control code set having a greatest number of control signals from among the plurality of remote control code sets of the selected group, and may transmit the control signals included in the selected remote control code set to the peripheral device 300.

In addition, the controller 120 may distinguish between the common control signal included in the plurality of remote control code sets and a control signal included in a specific remote control code set, in the selected group, and may transmit the control signal included in the specific remote control code set to the peripheral device 300.

Furthermore, the controller 120 may receive an image corresponding to the control signal from the peripheral device 300 through the communicator 110 and display the received image on the display 130.

Also, the controller 120 may extract peripheral device information included in the image. According to an example embodiment, the controller 120 may detect at least one of a logo, a text, and an image included in the image, and may extract peripheral device information based on at least one of the detected logo, text, and image. According to an example embodiment, the peripheral device information may include, but is not limited to, at least one of a manufacturer, a business name, and a model name of a peripheral device.

Furthermore, the controller 120 may determine a remote control code set corresponding to the peripheral device 300 based on the peripheral device information.

The controller 120 may transmit the determined remote control code set to the control device 200 for controlling the peripheral device 300 through the communicator 110.

The controller 120 may receive a remote control code set from an external server through the communicator 110 and store the received remote control code set in the storage 140.

Meanwhile, the controller 120 according to an example embodiment may process an image signal and input the image signal to the display 130. Accordingly, an image corresponding to the image signal may be displayed on the display 130.

The display 130 converts an image signal, a data signal, an On-Screen Display (OSD) signal, a control signal, etc. processed in the controller 120 to generate a driving signal. The display 130 may be implemented as a plasma display panel (PDP), a liquid crystal display (LCD), an organic light emitting diode display (OLED), a flexible display, or the like, and may also be implemented as a three-dimensional (3D) display. Also, the display 130 may be configured as a touch screen and used as an input device in addition to an output device.

The display 130 according to an example embodiment may display an image received from the peripheral device 300. The displayed image may be an image corresponding to a control signal, for example, a menu screen provided by a peripheral device, an electronic program guide (EPG) screen, or the like. However, the present disclosure is not limited thereto, and may be a screen including peripheral device information or setting information of a peripheral device.

The storage 140 may store a plurality of remote control code sets corresponding to peripheral devices. The plurality of remote control code sets may include a control signal for controlling functions of the peripheral devices.

According to an example embodiment, the storage 140 may classify a plurality of remote control code sets including a common control signal into one group and store them.

The storage 140 may match a remote control code set for controlling a peripheral device, at least one of a manufacturer, a business name, and a model name of the peripheral device, and at least one of a text, a logo, and an image corresponding to the peripheral device, with each other and store them.

Figure 3:
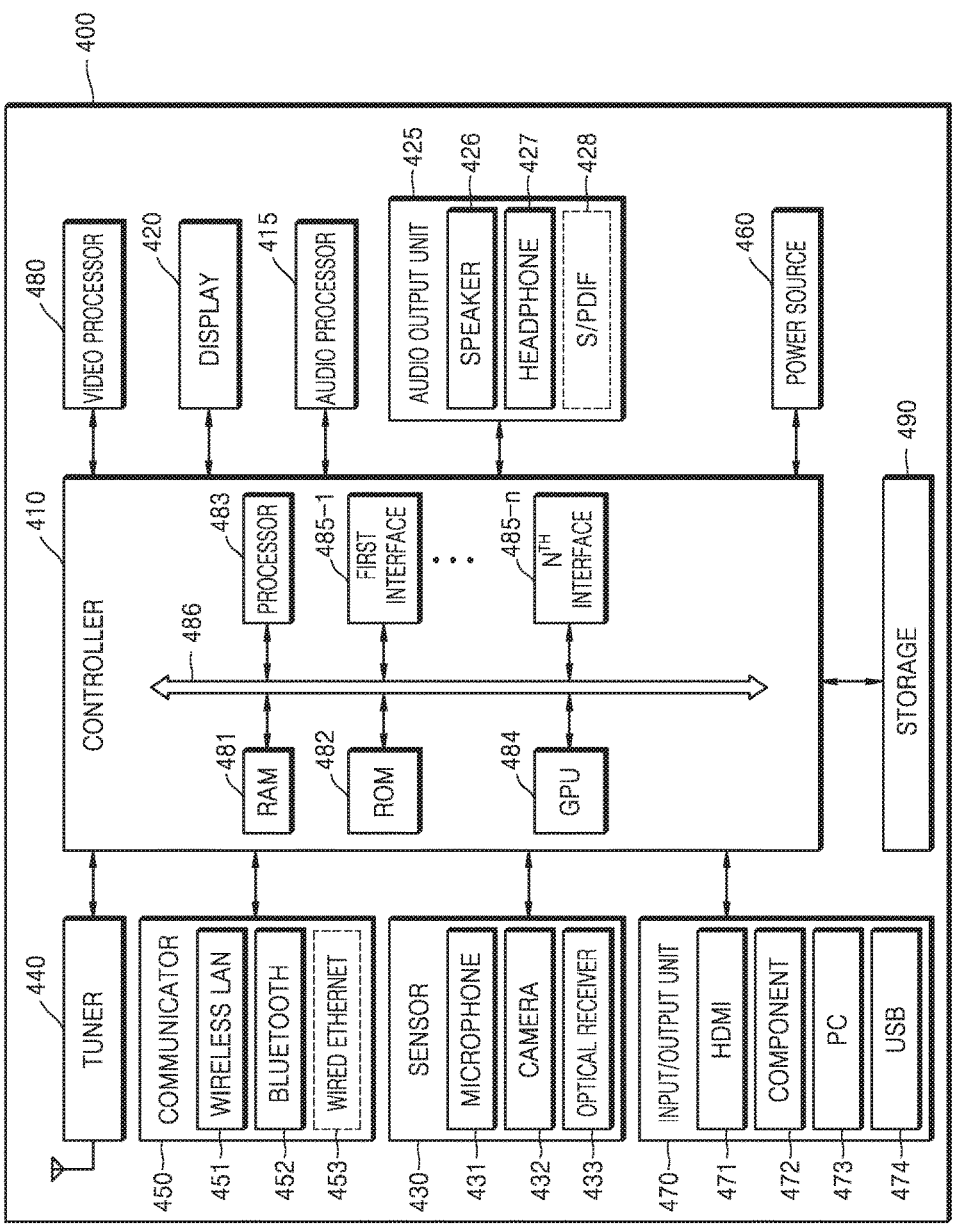
FIG. 3 is a block diagram of a configuration of an image display device according to another example embodiment.

FIG. 3 is a block diagram of a configuration of an image display device 400 according to another example embodiment. The image display device 400 of FIG. 3 may be an example embodiment of the image display device 100 of FIG. 1.

Referring to FIG. 3, the image display device 400 according to an example embodiment may further include a sensor 430, a video processor 480, an audio processor 415, an audio output unit 425, a power source 460, a tuner 440, and an input/output unit 470 in addition to a controller 410, a display 420, a communicator 450, and a storage 490.

The communicator 110 of FIG. 2 may correspond to the communicator 450 and the input/output unit 470 of FIG. 3, and the controller 120 of FIG. 2 may correspond to the controller 410 of FIG. 3, the display 130 of FIG. 2 may correspond to the display 120 of FIG. 3, and the storage 140 of FIG. 2 may correspond to the storage 490 of FIG. 3. In FIG. 3, the same reference numerals as in FIG. 2 denote the same elements, and further descriptions thereof shall be omitted.

The video processor 480 performs processing on video data received by the image display device 400. The video processor 480 may perform various types of image processing, such as decoding, scaling, noise filtering, frame rate conversion, or resolution conversion, on the video data.

The display 420 displays a video included in a broadcast signal received through the tuner 440 on a screen under the control of the controller 410. In addition, the display 420 may display content (for example, a video) input through the communicator 450 or the input/output unit 470. The display 420 may output an image stored in the storage 490 under the control of the controller 410. The display 420 may display a voice User Interface (UI) (e.g., including a voice command guide) for performing a voice recognition task corresponding to voice recognition, or a motion UI (e.g., including a user motion guide for motion recognition) for performing a motion recognition task corresponding to motion recognition.

The audio processor 415 performs processing on the audio data. The audio processor 415 may perform various processing, such as decoding, amplification, or noise filtering, on the audio data. Meanwhile, the audio processor 415 may include a plurality of audio processing modules for processing audio corresponding to pieces of content.

The audio output unit 425 outputs audio included in a broadcast signal received through the tuner 440 under the control of the controller 410. The audio output unit 425 may output audio (e.g., voice, sound) input through the communicator 450 or the input/output unit 470. The audio output unit 425 may output audio stored in the storage 490 under the control of the controller 410. The audio output unit 425 may include at least one of a speaker 426, a headphone output terminal 427, and a Sony/Philips Digital Interface (S/PDIF) output terminal 428. The audio output unit 425 may include a combination of the speaker 426, the headphone output terminal 427, and the S/PDIF output terminal 428.

The power source 460 supplies power input from external power source to internal components of the image display device 400 under the control of the controller 410. The power source 460 may supply power output from one or more batteries (not shown) located in the image display device 400 to the internal components under the control of the controller 410.

The tuner 440 may select only a frequency of a channel to be transmitted to the image display device 400 from among many electric wave components by tuning the same through amplification, mixing, resonance, etc. of a broadcast signal received through wire or wirelessly. The broadcast signal includes audio, video and additional information (for example, an EPG).

The tuner 440 may receive a broadcast signal in a frequency band corresponding to a channel number (for example, Ch. 506 of cable broadcasting) according to a user's input (for example, an input of a control signal from the control device 200 such as a channel number input, an up-down input of channels, and a channel input from an EPG display).

The tuner 440 may receive broadcast signals from various sources such as terrestrial broadcast, cable broadcast, satellite broadcast, Internet broadcast, and the like. The tuner 440 may receive a broadcast signal from a source such as an analog broadcast or a digital broadcast. A broadcast signal received through the tuner 440 is decoded (for example, audio decoding, video decoding, or additional information decoding) and separated into audio, video and/or additional information. The separated audio, video and/or additional information may be stored in the storage 490 under the control of the controller 410.

The tuner 440 of the image display device 400 may be one or more. The tuner 440 may be integrated with the image display device 400 or may be implemented as a separate device (for example, a set-top box (not shown)) having a tuner electrically connected to the image display device 400, or a tuner (not shown) connected to the input/output unit 470.

The communicator 450 may connect the image display device 400 to an external device (e.g., a peripheral device) under the control of the controller 410. The controller 410 may transmit/receive content to/from an external device connected through the communicator 450, download an application from the external device, or perform web browsing. The communicator 450 may include one of a wireless LAN 451, a Bluetooth 452, and a wired Ethernet 453 corresponding to performance and a structure of the image display device 400. The communicator 450 may include a combination of the wireless LAN 451, the Bluetooth 452, and the wired Ethernet 453. The communicator 450 may receive a control signal of the control device 200 under the control of the controller 410. The control signal may be implemented as a Bluetooth type, a radio frequency (RF) signal type, or a WiFi type.

The communicator 450 may further include short-range communication (for example, near field communication (NFC), not shown), and Bluetooth low energy (not shown)) other than Bluetooth.

The sensor 430 senses user's voice, a user's image, or a user's interaction.

A microphone 431 receives user's utterance. The microphone 431 may convert the received utterance into an electrical signal and output the electrical signal to the controller 410. User's voice may include, for example, voice corresponding to a menu or a function of the image display device 400. The microphone 431 may be integrated with the image display device 400 or may be separated from the image display device 400. The separated microphone 431 may be electrically connected to the image display device 400 through the communicator 450 or the input/output unit 470.

It should be understood by those of ordinary skill in the art that the microphone 431 may be omitted depending on performance and a structure of the image display device 400.

A camera 432 receives an image (for example, a continuous frame) corresponding to user motion including a gesture in a camera recognition range. The user motion may include, for example, motion of a user's body part, such as a user's face, a facial expression, a hand, a fist, a finger, or user's partial motion. The camera 432 may convert the received image into an electrical signal under the control of the controller 410 and output the electrical signal to the controller 410.

The controller 410 may select a menu displayed on the image display device 400 using a result of recognizing the received motion image or may control the image display device 400 corresponding to the result. For example, the controller 410 may control at least one o channel adjustment, volume adjustment, indicator movement, and cursor movement.

The camera 432 may include a lens (not shown) and an image sensor (not shown). The camera 432 may support optical zoom or digital zoom using a plurality of lenses and image processing. A recognition range of the camera 432 may be variously set according to an angle of the camera and surrounding environment conditions. When the camera 432 is composed of a plurality of cameras, the plurality of camera may receive a 3D still image or 3D motion.

The camera 432 may be integrated with the image display device 400 or may be separated from the image display device 400. A separate device (not shown) including the separated camera 432 may be electrically connected to the image display device 400 through the communicator 450 or the input/output unit 470.

It should be understood by those of ordinary skill in the art that the camera 432 may be omitted depending on performance and a structure of the image display device 400.

An optical receiver 433 receives an optical signal (including a control signal) received from the external control device 200 through an optical window (not shown) of a bezel of the display 120 or the like. The optical receiver 433 may receive an optical signal corresponding to a user input (e.g., touch, press, touch gesture, voice, or motion) from the control device 200. A control signal may be extracted from the received optical signal under the control of the controller 410.

The input/output unit 470 receives video (e.g., a moving picture, etc.), audio (e.g., voice, music, etc.), and additional information (e.g., an EPG, etc.) from the outside of the image display device 400 under the control of the controller 410. The input/output unit 470 may include one of an HDMI port 471, a component jack 472, a PC port 473, and a Universal Serial Bus (USB) port 474. The input/output unit 470 may include a combination of the HDMI port 471, the component jack 472, the PC port 473, and the USB port 474.

It should be understood by those of ordinary skill in the art that configurations and operations of the input/output unit 470 may be variously implemented according to example embodiments.

The controller 410 controls all operations of the image display device 400 and a signal flow between internal components of the image display device 400 and performs data processing. The controller 410 may execute an operating system (OS) and various applications stored in the storage 490 when the controller 490 receives a user input or satisfies predetermined conditions.

The controller 410 may store signals or data input from the outside of the image display device 400 or may include a Random Access Memory (RAM) 481 used as a storage area corresponding to various operations performed in the image display device 400, a Read Only Memory (ROM) 482 in which a control program for controlling the image display device 400 is stored, and a processor 483.

The processor 483 may include a graphics processing unit (GPU) (not shown) for graphics processing corresponding to a video. The processor 483 may be implemented as a System On Chip (SoC) integrating a core (not shown) and the GPU (not shown). The controller 483 may include a single core, a dual core, a triple core, a quad core, and multiples thereof.

Furthermore, the processor 483 may include a plurality of processors. For example, the processor 483 may be implemented with a main processor (not shown) and a sub processor (not shown) operating in a sleep mode.

A graphics processing unit 484 generates a screen including various objects such as an icon, an image, and a text using a calculator (not shown) and a renderer (not shown). The calculator calculates attribute values such as a coordinate value, a shape, a size, or a color with respect to each object according to a layout of the screen by using a user input sensed through the sensor 430. The renderer generates images of various layouts including objects based on the attribute values calculated by the calculator. The images generated by the renderer are displayed in a display area of the display 420.

First to $n^{th}$ interfaces 485-1 to 485-n are connected to the various components described above. One of the interfaces may be a network interface connected to an external device via a network.

The RAM 481, the ROM 482, the processor 483, the graphics processing unit 484, and the first to $n^{th}$ interfaces 485-1 to 485-n may be interconnected via an internal bus 486.

In present example embodiment, the term "a controller of an image display device" includes the processor 483, the ROM 482, and the RAM 481.

The storage 490 may store various data, programs or applications for driving and controlling the image display device 400 under the control of the controller 410. The storage 490 may store input/output signals or data corresponding to driving of the video processor 480, the display 420, the audio processor 415, the audio output unit 425, the power source 460, the tuner 440, the communicator 450, the sensor 430, and the input/output unit 470. The storage 490 may store a control program for controlling the image display device 400 and the controller 410, and an application initially provided from a manufacturer or downloaded from outside, a graphical user interface (GUI) related to the application, objects (e.g., images, texts, icons, buttons, etc.) for providing the GUI, user information, documents, databases, or related data.

In an example embodiment, the term "storage" includes the storage 490, the ROM 482 of the controller 410, the RAM 481, or a memory card (e.g., a micro Secure Digital (SD) card, a USB Memory; not shown). In addition, the storage 490 may include a nonvolatile memory, a volatile memory, a hard disk drive (HDD), or a solid state drive (SSD).

The storage 490 may include a broadcast receiving module, a channel control module, a volume control module, a communication control module, a voice recognition module, a motion recognition module, a light receiving module, a display control module, an audio control module, an external input control module, a power control module, a power control module of an external device connected to the storage 490 wirelessly (for example, Bluetooth), a voice database DB, or a motion DB that are not shown. The modules and databases (not shown) in the storage 490 may be implemented in the image display device 400 in a software form to perform a broadcast reception control function, a channel control function, a volume control function, a communication control function, a voice recognition function, a motion recognition function, a light reception control function, a display control function, an audio control function, an external input control function, a power control function, or a power control function of an external device connected to the storage 490 wirelessly (for example, Bluetooth). The controller 410 may perform respective functions using the pieces of software stored in the storage 490.

The storage 490 according to an example embodiment may match at least one of a manufacturer, a business name, and a model name of the peripheral device, and at least one of a text, a logo, and an image corresponding to the peripheral device, with each other and store them.

Also, the storage 490 may classify a plurality of remote control code sets including a common control signal among remote control code sets corresponding to one or more external devices into one group and store them.

In addition, the image display device 400 having the display 420 may be electrically connected to a separate external device (e.g., a set-top box, not shown) having a tuner. For example, the image display device 400 may be implemented as an analog TV, a digital TV, a 3D TV, a smart TV, an LED TV, an OLED TV, a plasma TV, a monitor, or the like, but is not limited thereto.

Furthermore, the image display device 400 may include a sensor (for example, an illumination sensor, a temperature sensor, or the like, not shown) for detecting an internal or external state of the image display device 400.

Meanwhile, the block diagrams of the image display devices 100 and 400 shown in FIGS. 2 and 3 are block diagrams for one example embodiment. Each component of the block diagram may be integrated, added, or omitted, depending on specifications of the image display devices 100 and 400 that are actually implemented. For example, combining two or more elements are in a single component, as needed, or may be one component configuration is subdivided into two or more components. In addition, the functions performed by the respective blocks are for purposes of describing the embodiments, that the specific operation and the device shall not limit the scope of the present disclosure.

Figure 4:
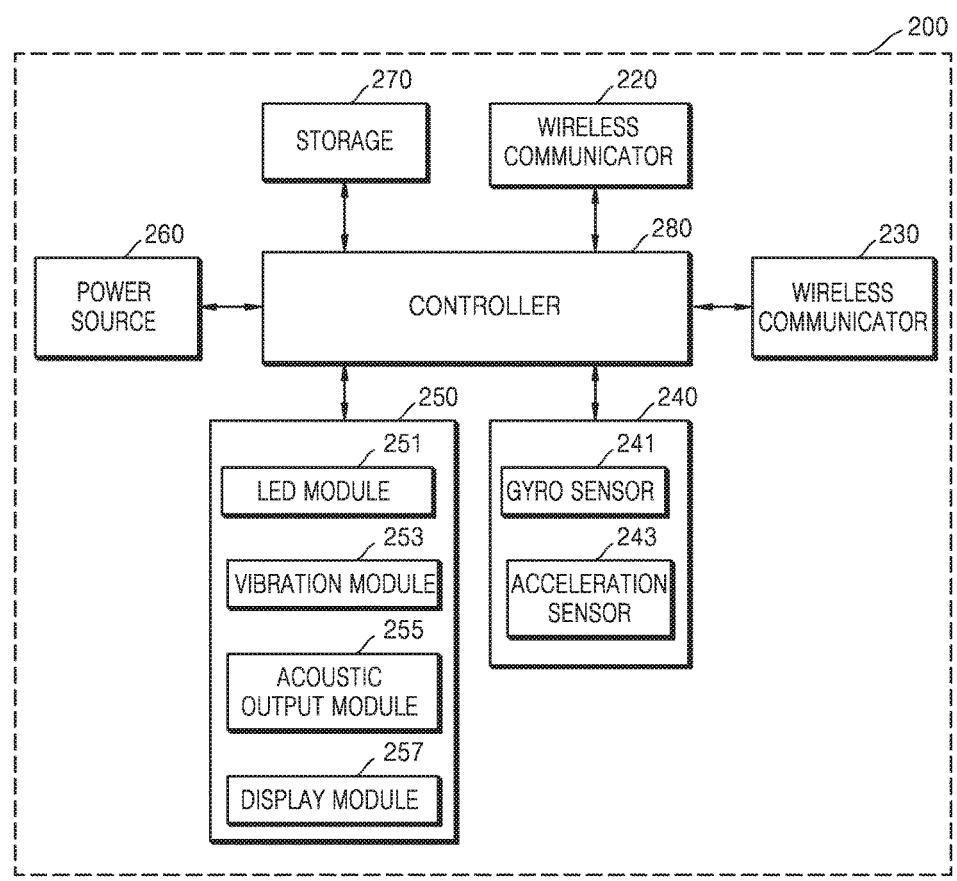
FIG. 4 is a block diagram of a configuration of a control device according to an example embodiment.

FIG. 4 is a block diagram of a configuration of the control device 200 according to an example embodiment.

Referring to FIG. 4, the control device 200 may include a wireless communicator 220, a user input unit 230, a sensor unit 240, an output unit 250, a power source 260, a storage 270, and a controller 280.

The wireless communicator 220 may transmit and receive signals to/from any one of the image display device or the peripheral device according to the above-described example embodiments. The wireless communicator 220 may include an IR module capable of transmitting and receiving signals with the image display device 100 or the peripheral device 300 according to an IR communication standard. For example, the control device 200 may transmit commands to the image display device 100 or the peripheral device 300 via the IR module, such as power on/off, channel change, volume change, and the like, as needed.

Alternatively, the wireless communicator 220 may transmit and receive signals to/from the image display device 100 or the peripheral device 300 in a form of wireless LAN (e.g., Wi-Fi), Bluetooth, BLE, ultrasonic, or Zigbee.

The control device 200 according to an example embodiment may receive a control signal transmission command for controlling the peripheral device 300 from the image display device 100 through the wireless communicator 220.

In addition, the control device 200 may transmit a control signal corresponding to the control signal transmission command to the peripheral device 300.

The user input unit 230 may include a keypad, a button, a touchpad, or a touch screen. A user may operate the user input unit 230 to input commands related to the image display device 100 or the peripheral device 300 to the control device 200. When the user input unit 230 has a hard key button, the user may input commands related to the image display device 100 or the peripheral device 300 to the control device 200 through a push operation of the hard key button. When the user input unit 230 has a touch screen, the user may touch a soft key of the touch screen to input commands related to the image display device 100 or the peripheral device 300 to the control device 200.

The sensor unit 240 may include a gyro sensor 241 or an acceleration sensor 243. The gyro sensor 241 may sense information on motion of the control device 200. For example, the gyro sensor 241 may sense information on an operation of the control device 200 based on X, Y, and Z axes. The acceleration sensor 243 may sense information about a moving speed of the control device 200 and the like. Meanwhile, the acceleration sensor 243 may further include a distance measuring sensor, thereby sensing a distance to the image display device 100.

The output unit 250 may output video or audio signals corresponding to an operation of the user input unit 230 or corresponding to signals received from the image display device 100 or the peripheral device 300. The user may recognize whether the user input unit 230 is operated or whether the image display device 100 or the peripheral device 300 is controlled through the output unit 250.

For example, the output unit 250 may include a light-emitting diode (LED) module 251 that is turned on when the user input unit 230 is operated or a signal is transmitted to or received from the image display device 100 or the peripheral device 300 through the wireless communicator 220, a vibration module 253 for generating vibration, an acoustic output module 255 for outputting sound, or a display module 257 for outputting an image.

The power source 260 supplies power to the control device 200. The power source 260 may reduce power consumption by stopping power supply when the control device 200 is not moving for a predetermined period of time. The power source 260 may resume power supply when a predetermined key in the control device 200 is operated.

The storage 270 may store various types of programs, application data, and the like necessary for control or an operation of the control device 200.

The storage 270 according to an example embodiment may store a remote control code set corresponding to external devices.

The controller 280 controls all matters related to the control of the control device 200. The controller 280 may transmit a signal corresponding to a predetermined key operation of the user input unit 230 or a signal corresponding to motion of the control device 200 sensed by the sensor unit 240 to the image display device 100 or the peripheral device 300 through the wireless communicator 220.

The controller according to an example embodiment may register a remote control code set corresponding to the peripheral device 300. The controller 280 may control a function of the peripheral device 300 by transmitting a control signal included in the remote control code set to the peripheral device 300.

Figure 5:
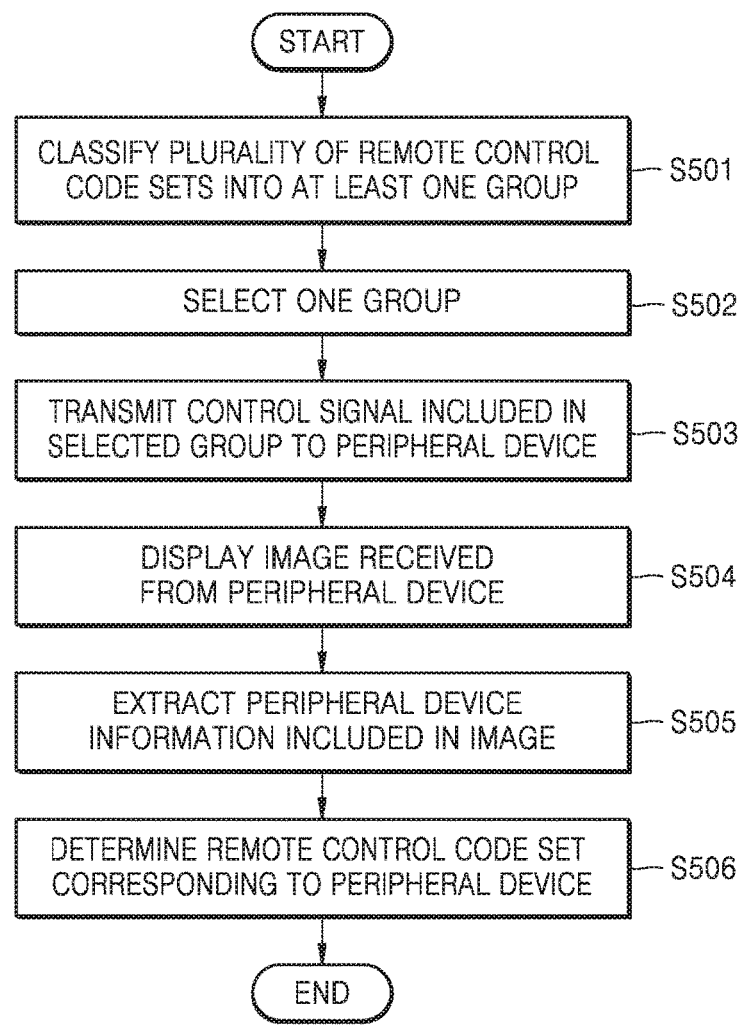
FIG. 5 is a flowchart of a method of operating an image display device, according to an example embodiment.

FIG. 5 is a flowchart of a method of operating the image display device 100 according to an example embodiment.

Referring to FIG. 5, in operation S501, the controller 120 of the image display device 100 according to an example embodiment may classify a plurality of remote control code sets into at least one group.

According to an example embodiment, the storage 140 of the image display device 100 may store a plurality of remote control code sets. The controller 120 may classify a plurality of remote control code sets stored in the storage 140 into at least one group based on a control signal included in the plurality of remote control code sets.

According to an example embodiment, the plurality of remote control code sets may include a plurality of control signals for controlling a function of a peripheral device.

The controller 120 may classify a plurality of remote control code sets including a common control signal among the plurality of remote control code sets into one group. For example, when a control signal included in a remote control code set corresponding to a broadcasting company A and a control signal included in a remote control code set corresponding to a broadcasting company B are identical, the remote control code set of the broadcasting company A and the remote control code set of the broadcasting company B may be classified into one group.

In operation S502, the controller 120 of the image display device 100 according to an example embodiment may select one from among the one or more classified groups.

According to an example embodiment, the controller 120 may select one group to transmit a control signal to the peripheral device 300. The controller 120 may select one group based on a predetermined priority.

According to an example embodiment, the controller 120 may determine the priority based on usage frequency information per group. For example, the controller 120 may raise a priority of a remote control code set of a broadcasting company which users frequently use.

According to an example embodiment, the image display device 100 preferentially transmits a control signal included in the frequently used remote control code set to the peripheral device 300 so that probability that a remote control code set corresponding to the peripheral device 300 is searched using the preferentially transmitted control signal may be increased. Accordingly, time for searching for a remote control code set corresponding to the peripheral device 300 is shortened, so that remote control setting may be performed more quickly.

In operation S503, the controller 120 of the image display device 100 may transmit the control signal included in the selected group to the peripheral device 300.

According to an example embodiment, the image display device 100 may transmit the control signal to the peripheral device 300 through the communicator 110. A wireless communication method may include IR, Bluetooth, BLE, ultrasound, ZigBee, WiFi, and the like. However, the present disclosure is not limited thereto. Alternatively, the image display device 100 may transmit the control signal to the peripheral device 300 through an HDMI-CEC cable.

When the image display device 100 transmits the control signal to the peripheral device 300, the control signal may include, but is not limited to, a signal for controlling display of a menu screen, a broadcast guide screen, and the like supported by the peripheral device 300.

Furthermore, according to an example embodiment, the image display device 100 may transmit the control signal to the control device 200 through the communicator 110. An example in which the image display device 100 transmits the control signal to the control device 200 will be described later below with reference to FIG. 6.

Meanwhile, the image display device 100 may continuously transmit the control signal until a change in an image displayed on the display 130 is detected. The image display device 100 may change a group of remote control codes and select the same to transmit a control signal included in the changed group to the control device 200 or the peripheral device 300.

In operation S504, the controller 120 of the image display device 100 may display an image received from the peripheral device 300.

According to an example embodiment, the controller 120 may receive an image corresponding to the control signal transmitted to the peripheral device 300 from the peripheral device 300.

For example, when the peripheral device 300 receives a control signal requesting a menu screen, an information screen, a broadcast guide screen, or the like from the control device 200 or the image display device 100, an image signal corresponding to the menu screen, an information screen, a broadcast guide screen, or the like may be transmitted to the image display device 100.

In operation S505, the controller 120 of the image display device 100 may extract peripheral device information included in the image.

According to an example embodiment, the image display device 100 may analyze the image received from the peripheral device 300 and extract the peripheral device information.

For example, the image display device 100 may recognize at least one of a logo, a text, and an image included in the image. The image display device 100 may extract the peripheral device information based on at least one of the recognized logo, text, and image.

According to an example embodiment, the peripheral device information may include, but is not limited to, at least one of a manufacturer, a business name, and a model name of a peripheral device.

For example, the image display device 100 may extract a manufacturer, a business name, a model name, and the like corresponding to at least one of the recognized logo, text, and image. At least one of the logo, text, and image corresponding to a peripheral device may be stored in the storage 140 of the image display device 100.

In operation S506, the controller 120 of the image display device 100 may determine a remote control code set corresponding to a peripheral device.

The controller 120 according to an example embodiment may determine a remote control code set corresponding to the peripheral device 300 based on the extracted peripheral device information. For example, when a business name (for example, a broadcasting company A) is extracted from the logo included in the image received from the peripheral device 300, the controller 120 may determine a remote control code set of the broadcasting company A as the remote control code set corresponding to the peripheral device 300.

According to an example embodiment, the image display device 100 may transmit the determined remote control code set to the control device 200, and the control device 200 may register the received remote control code set in the control device 200. When the remote control code set corresponding to the peripheral device 300 is registered in the control device 200, the control device 200 may control the peripheral device 300.

According to another example embodiment, the image display device 100 transmits a control signal to the peripheral device 300 and analyzes sound output from the image display device 100 based on audio data received from the peripheral device 300 in response to the control signal, and thus may determine a remote control code set corresponding to the peripheral device 300.

Figure 6:
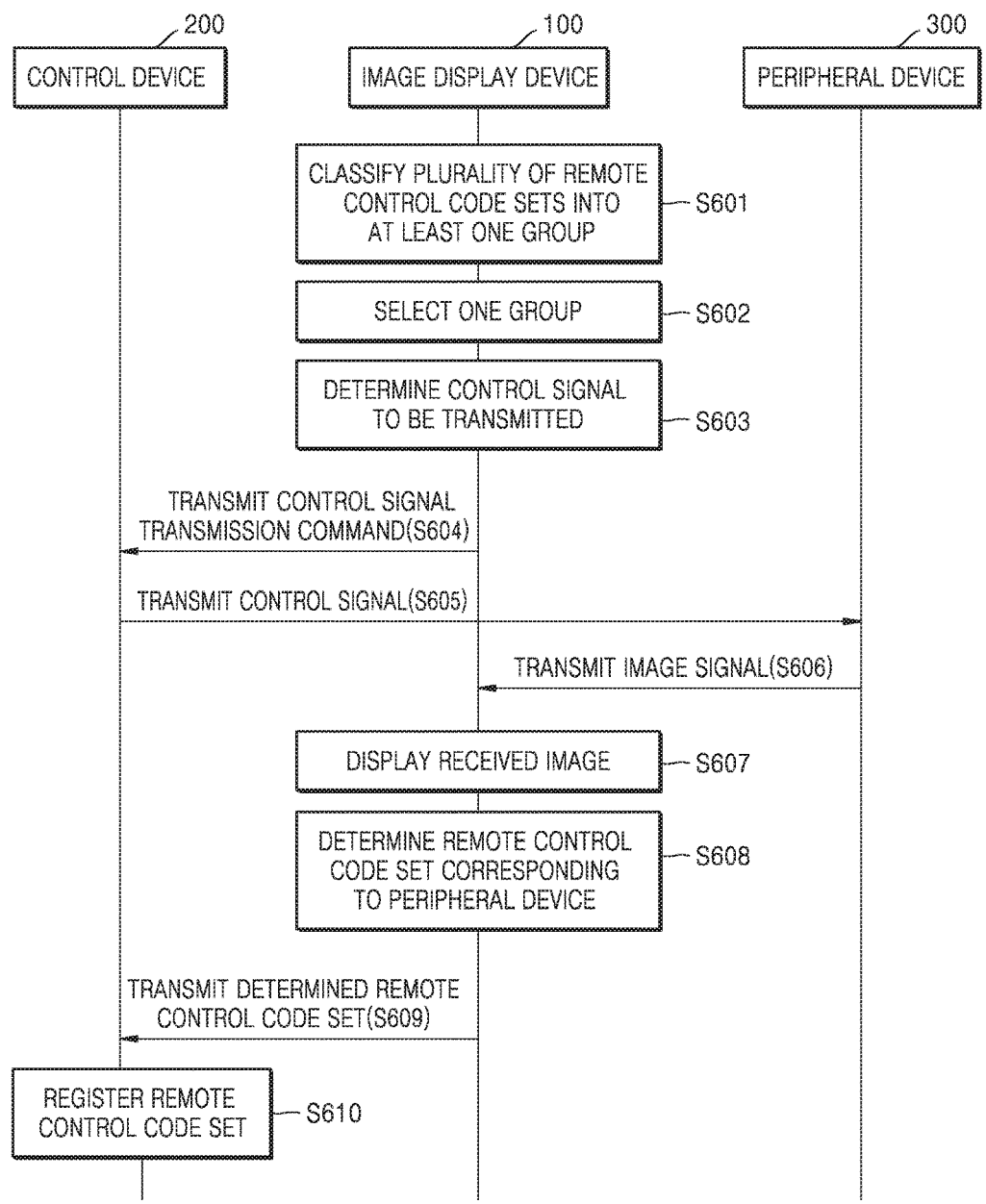
FIG. 6 is a flowchart of a method of setting an integrated remote controller for controlling a peripheral device, according to an example embodiment.

FIG. 6 is a flowchart of a method of setting an integrated remote controller for controlling the peripheral device 300, according to an example embodiment.

According to an example embodiment, the image display device 100 and the peripheral devices 300 may be connected to each other through a wired or wireless network. For example, the image display device 100 and the peripheral device 300 may be connected to each other via an HDMI cable or an HDMI-CEC cable. Also, the image display device 100 and the peripheral device 300 may be connected to each other by using wireless communication such as Bluetooth, BLE, Zigbee, WiFi, or the like.

In operation S601, the controller 120 of the image display device 100 may classify a plurality of remote control code sets into at least one group. In operation S602, the controller 120 of the image display device 100 may select one from among the one or more classified groups. Detailed descriptions of operations S601 and S602 will not be given herein since they are described above with reference FIG. 5.

In operation S603, the controller 120 of the image display device 100 may determine a control signal to be transmitted.

According to an example embodiment, the controller 130 may determine a control signal common to a plurality of remote control code sets included in a selected group as a control signal to be transmitted.

Also, the controller 130 may select a remote control code set having a greatest number of control signals from among the plurality of remote control code sets of the selected group, and may transmit the control signals included in the selected remote control code set to the peripheral device 300.

In addition, the controller 130 may distinguish between the common control signal included in the plurality of remote control code sets and a control signal included in a specific remote control code set, in the selected group, and may transmit the control signal included in the specific remote control code set to the peripheral device 300. In this regard, it will be described in more detail in descriptions of FIGS. 12 and 13 to be described later below.

In operation S604, the controller 120 of the image display device 100 may transmit a control signal transmission command to the control device 200. In operation S605, the control device 200 may transmit a control signal to the peripheral device 300.

According to an example embodiment, the image display device 100 may transmit a signal commanding the control device 200 to transmit a control signal to the peripheral device 300. For example, the image display device 100 may transmit a signal for commanding the control device 200 to transmit a signal for controlling display of a menu screen, a broadcast guide screen, or the like to the peripheral device 300 in response to a menu key, an information key, a broadcast guide key to the control device 200.

In operation S606, the peripheral device 300 may transmit an image signal corresponding to the control signal to the image display device 100, in response to the control signal received from the control device 200. According to an example embodiment, the peripheral device 300 may transmit an image signal for displaying a menu screen or the like to the image display device 100 in response to the signal for controlling display of the menu screen, the broadcast guide screen, or the like.

In operation S607, the image display device 100 may display an image received from the peripheral device 300. In operation S608, the image display device 100 may determine a remote control code set corresponding to the peripheral device 300. Detailed descriptions of operations S601 and S602 will not be given herein since they are described above with reference operations S504, S505, and S506 in FIG. 5.

In operation S609, the image display device 100 may transmit the determined remote control code set. In operation S610, the image display device 100 may register the received remote control code set as a remote control code set corresponding to the peripheral device 300.

According to an example embodiment, the control device 200 may receive a remote control code set and register the received remote control code set in the control device 200. When the remote control code set corresponding to the peripheral device 300 is registered in the control device 200, the control device 200 may control the peripheral device 300 using the registered remote control code set.

Meanwhile, the control device 200 according to an example embodiment may receive one or more remote control code sets from the image display device 100 or an external server in advance and store them. When the remote control code set corresponding to the peripheral device 300 is stored in the control device 200 in advance, the image display device 100 may transmit a control command to the control device 200 to register the remote control code set corresponding to the peripheral device 300 in the control device 200.

Figure 7:
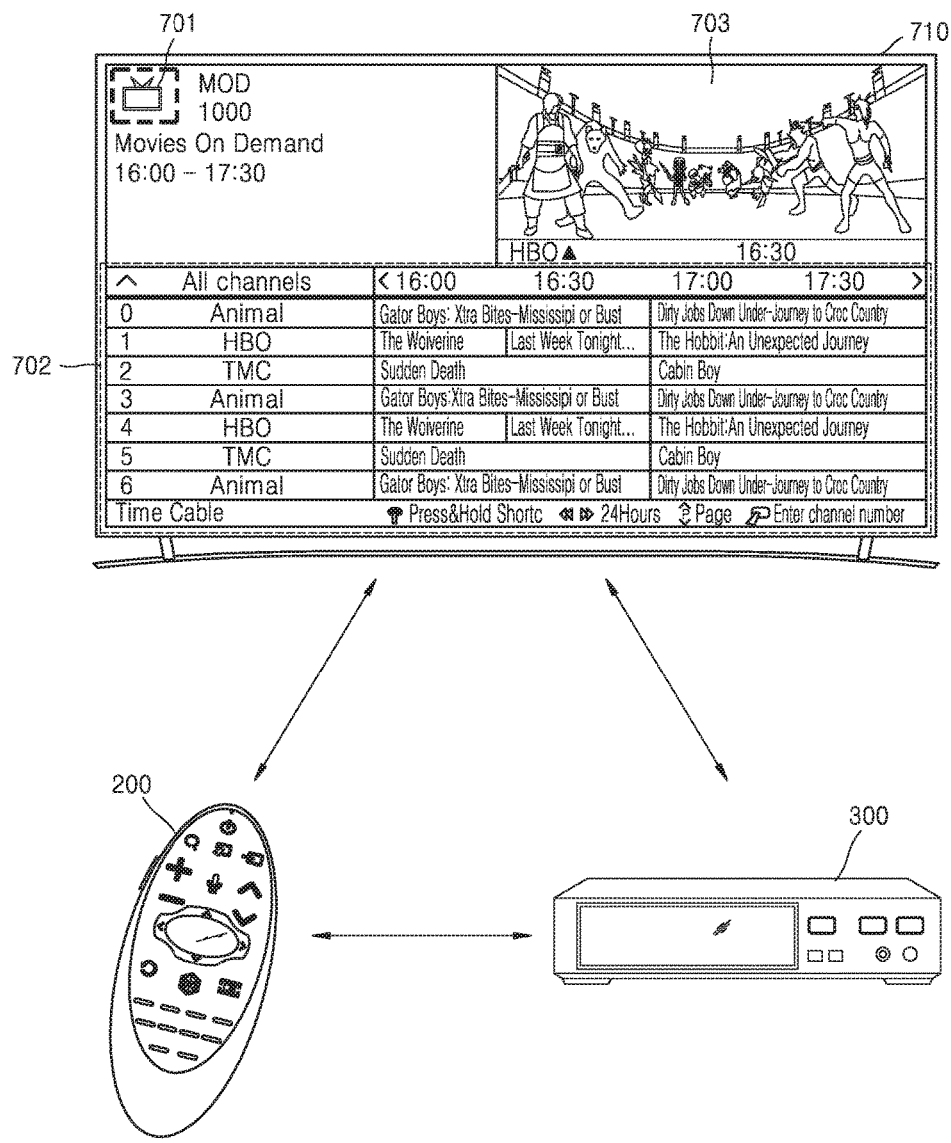
FIG. 7 is a view of a method of setting an integrated remote controller, according to an example embodiment.

FIG. 7 is a view of a method of setting an integrated remote controller, according to an example embodiment.

Referring to FIG. 7, the image display device 100 according to an example embodiment may transmit a control signal transmission command for causing the control device 200 to transmit a control signal to the peripheral device 300 through the communicator 110. A wireless communication method may include, but is not limited to, IR, Bluetooth, BLE, ultrasound, Zigbee, WiFi, and the like.

According to an example embodiment, the control device 200 may transmit a control signal to the peripheral device 300 through the wireless communicator 220. A wireless communication method may include, but is not limited to, IR, Bluetooth, BLE, ultrasound, Zigbee, WiFi, and the like.

According to an example embodiment, the control signal transmitted from the control device 200 to the peripheral device 300 may be, but is not limited to, a signal for controlling display of a menu screen, a broadcast guide screen, and the like supported by the peripheral device 300.

According to an example embodiment, the peripheral device 300 may transmit an image signal corresponding to the control signal to the image display device 100, in response to the control signal received from the control device 200. For example, when the control device 200 transmits a broadcast guide key signal to the peripheral device 300, the peripheral device 300 may transmit an image signal corresponding to the broadcast guide screen to the image display device 100. Alternatively, when the control device 200 transmits an information key signal to the peripheral device 300, the peripheral device 300 may transmit an image signal corresponding to an information screen to the image display device 100.

The image display device 100 may display an image based on the image signal received from the peripheral device 300. As shown in FIG. 7, the image display device 100 may display a broadcast guide screen 710.

The image display device 100 may analyze the displayed image. For example, as shown in FIG. 7, the image display device 100 may recognize at least one of a logo 701, a text 702, and an image 703 included in the displayed image.

Also, the image display device 100 may extract peripheral device information based on at least one of the recognized 701, text 702, and image 703. For example, the image display device 100 may extract a manufacturer or a business name of the peripheral device 300 corresponding to the recognized logo 701 and the text 702.

The image display device 100 according to an example embodiment may search for a remote control code set corresponding to the extracted manufacturer or business name and may determine the searched remote control code set as a remote control code set corresponding to the peripheral device 300.

According to an example embodiment, when the remote control code set corresponding to the peripheral device 300 is determined, the image display device 100 may transmit the remote control code set to the control device 200. The control device 200 may register the received remote control code set and control the peripheral device 300 using the registered remote control code set.

FIG. 7 is a view for explaining an example embodiment, but the present disclosure is not limited thereto.

Figure 8:
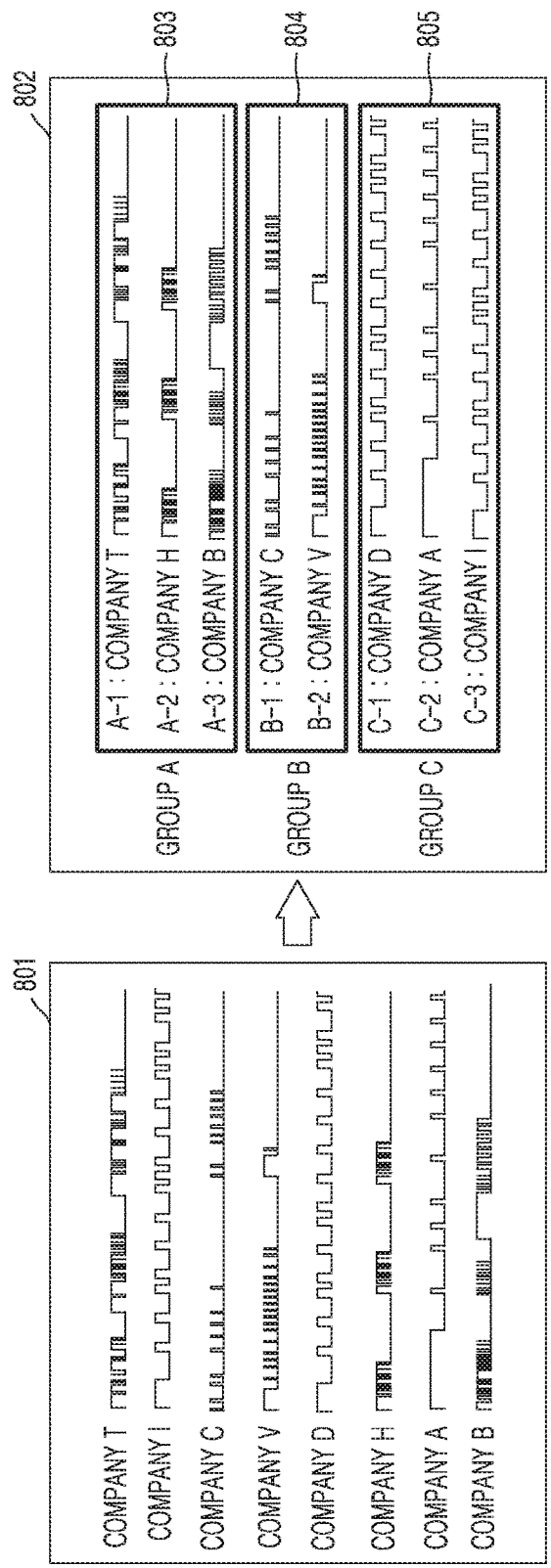
FIG. 8 is a view for explaining an example of classifying a plurality of remote control code sets, according to an example embodiment.

FIG. 8 is a view for explaining an example of classifying a plurality of remote control code sets, according to an example embodiment.

As shown in FIG. 8, the storage 140 may classify a plurality of remote control code sets 801 into at least one group 802 and store them. According to an example embodiment, a plurality of remote control code sets may be remote control code sets for controlling broadcasting provided by a plurality of broadcasting companies.

For example, the controller 120 classifies a remote control code set of a broadcasting company T, a broadcasting company H, and a broadcasting company B into one group (group A) 803 and a remote control code set of a broadcasting company C and a broadcasting company V into one group (group B) 804. Also, the controller 120 may classify a remote control code set of a broadcasting company D, a broadcasting company A, and a broadcasting company I into one group (group C) 805.

The controller 120 according to an example embodiment may classify a plurality of remote control code sets stored in the storage 140 into at least one group based on a control signal included in the plurality of remote control code sets. According to an example embodiment, the controller 120 may classify remote control code sets including a common control signal into one group.

For example, when the remote control code set used by the broadcasting company T and the remote control code set used by the broadcasting company H are identical, the remote control code set of the broadcasting company T and the remote control code set of the broadcasting company H may be classified into one group.

Furthermore, for example, when the remote control code set used by the broadcasting company C and the remote control code set used by the broadcasting company V include an identical control signal at a predetermined ratio or more, the remote control code set of the broadcasting company C and the remote control code set of the broadcasting company V may be classified into one group.

Referring to FIG. 8, a remote control code set corresponding to a peripheral device may be searched by transmitting, for example, control signals included in three groups to the storage 140 without transmitting control signals included in eight remote control code sets, respectively. Thereby, the number of times of transmission of control signals is reduced, and the search time of the remote control code set corresponding to the peripheral device may be reduced.

FIG. 8 is a view for explaining an example embodiment, but the present disclosure is not limited thereto.

Figure 9:
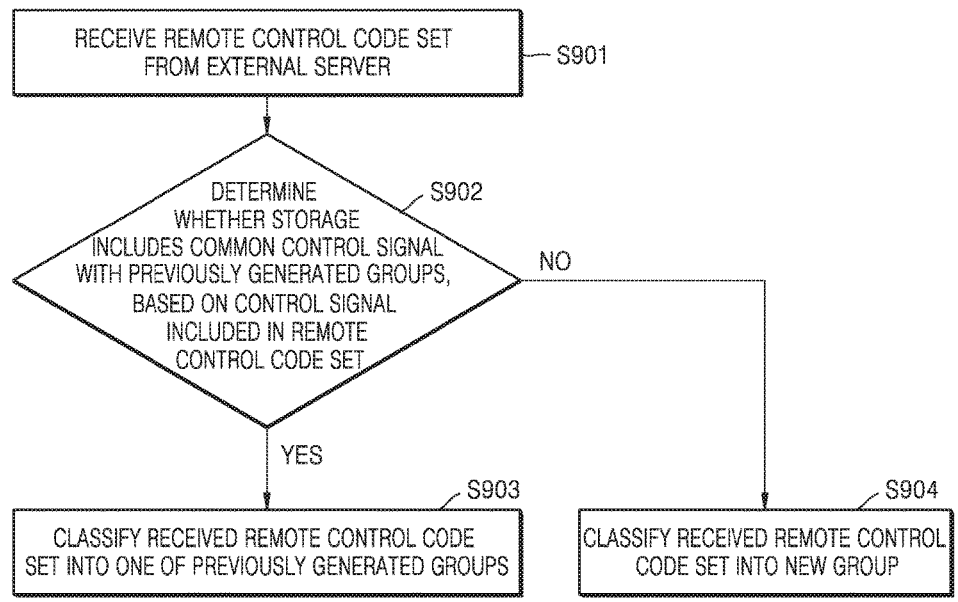
FIG. 9 is a flowchart of a method of classifying a remote control code set received from an external server, according to an example embodiment.

FIG. 9 is a flowchart of a method of classifying a remote control code set received from an external server, according to an example embodiment.

In operation S901, the image display device 100 may receive the remote control code set from the external server. According to an example embodiment, the image display device 100 may update database DB of a remote control code set stored in the storage 140 by receiving the remote control code set from the external server.

In operation S902, the image display device 100 may determine whether the storage 140 includes a common control signal with previously generated groups, based on a control signal included in the received remote control code set.

According to an example embodiment, the controller 120 may analyze the control signal included in the received remote control code set and determine whether the control signal can be included in any one of groups stored in the storage 140.

In operation S903, if it is determined that the control signal included in the received remote control code set includes the common control signal with any one of the previously generated groups, the controller 120 may classify the received remote control code set into any one of the previously generated groups. According to an example embodiment, when the control signal included in the received remote control code set is the same as a predetermined ratio or more of control signals of the previously generated groups, the controller 120 may classify the received remote control code set into the same group as the one of the previously generated groups.

According to an example embodiment, the controller 120 may classify the remote control code set received from the external server into one of the previously generated groups and store the remote control code set in the storage 140.

In operation S904, if it is determined that the control signal included in the received remote control code set does not include the common control signal with the previously generated group, the controller 120 may classify the received remote control code set into a new group.

According to an example embodiment, the controller 120 may classify the plurality of remote control code sets received from the external server into a new group and store the plurality of remote control code sets in the storage 140.

Meanwhile, according to an example embodiment, the controller 120 may store a brand name, a model name, and the like set by a user input as one of peripheral device information corresponding to a remote control code set.

FIG. 10 is a view for explaining an example of information stored corresponding to a plurality of remote control code sets, according to an example embodiment.

Referring to FIG. 10, the storage 140 according to an example embodiment may store a plurality of remote control code sets into a plurality of groups (for example, group A, group B, and group C) 1001, 1002, and 1003.

Furthermore, the storage 140 according to an example embodiment may store a plurality of remote control code sets and peripheral device information (e.g., a manufacturer, a business name, a logo, etc.) 1004 corresponding to each of the plurality of remote control code sets, the number 1005 of control signals included in the plurality of remote control code sets, and priority information 1006 based on usage frequency of the plurality of remote control code sets.

Meanwhile, according to an example embodiment, when selecting a remote control code set to be transmitted to a peripheral device, the controller 120 of the image display device 100 may use information on the number of control signals included in the remote control code set. For example, when transmitting a remote control code set of group A, the controller 120 may select a remote control code set A-2 having a greatest number of control signals included in the remote control code set.

Furthermore, according to an example embodiment, when selecting a remote control code set to be transmitted to a peripheral device, the controller 120 of the image display device 100 may use usage frequency information of the remote control code set. For example, the controller 120 may select a control signal included in the remote control code set of group A with high usage frequency.

FIG. 10 is a view for explaining an example embodiment, but the present disclosure is not limited thereto.

Figure 11:
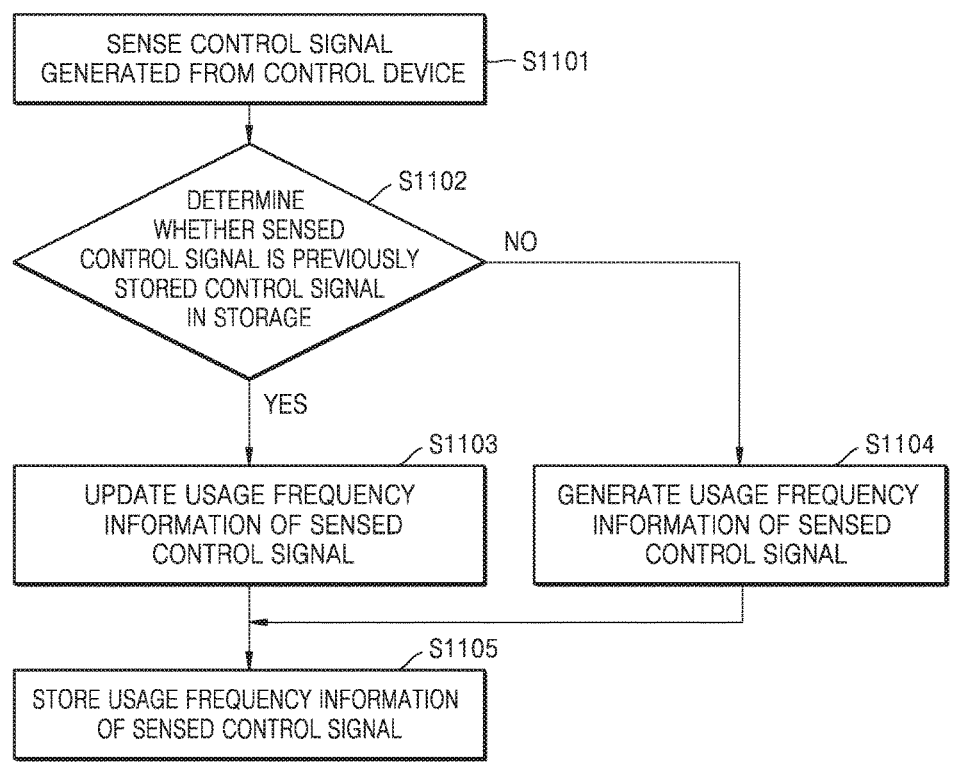
FIG. 11 is a flowchart of a method of storing usage frequency information of a control signal, according to an example embodiment.

FIG. 11 is a flowchart of a method of storing usage frequency information of a control signal, according to an example embodiment.

In operation S1101, according to an example embodiment, the image display device 100 may sense a control signal generated from the control device 200 through the communicator 110. A wireless communication method may include, but is not limited to, IR, Bluetooth, BLE, ultrasound, Zigbee, WiFi, and the like.

In operation S1102, the controller 120 of the image display device 100 may determine whether the sensed control signal is a previously stored control signal in the storage 140.

According to an example embodiment, the controller 120 may filter the sensed control signal when the sensed control signal is a control signal for controlling the image display device 100, and may determine whether the sensed control signal is a previously stored control signal in the storage 140 when the sensed control signal is not a control signal for controlling the image display device 100.

In operation S1103, when the sensed control signal is a previously stored control signal in the storage 140, the controller 120 of the image display device 100 may update usage frequency information of the sensed control signal. For example, with respect to a frequently sensed control signal, usage frequency information may be updated to indicate that usage frequency is high.

In operation S1104, when the sensed control signal is not a previously stored control signal in the storage 140, the controller 120 of the image display device 100 may generate usage frequency information of the sensed control signal. According to an example embodiment, when a new control signal that is not stored in the storage 140 is sensed, the controller 120 may generate usage frequency information corresponding to the sensed control signal, and may update the usage frequency information as the same control signal is re-detected later.

In operation S1105, the controller 120 of the image display device 100 may store the usage frequency information of the sensed control signal. According to an example embodiment, the controller 120 may store updated or generated usage frequency information.

According to an example embodiment, the controller 120 of the image display device 100 may set a priority of a remote control code set to be transmitted to a peripheral device based on the usage frequency information of the control signal. According to an example embodiment, the image display device 100 may preferentially transmit a frequently used remote control code set to a peripheral device, thereby shortening search time for determining a remote control code set corresponding to the peripheral device.

Figure 12:
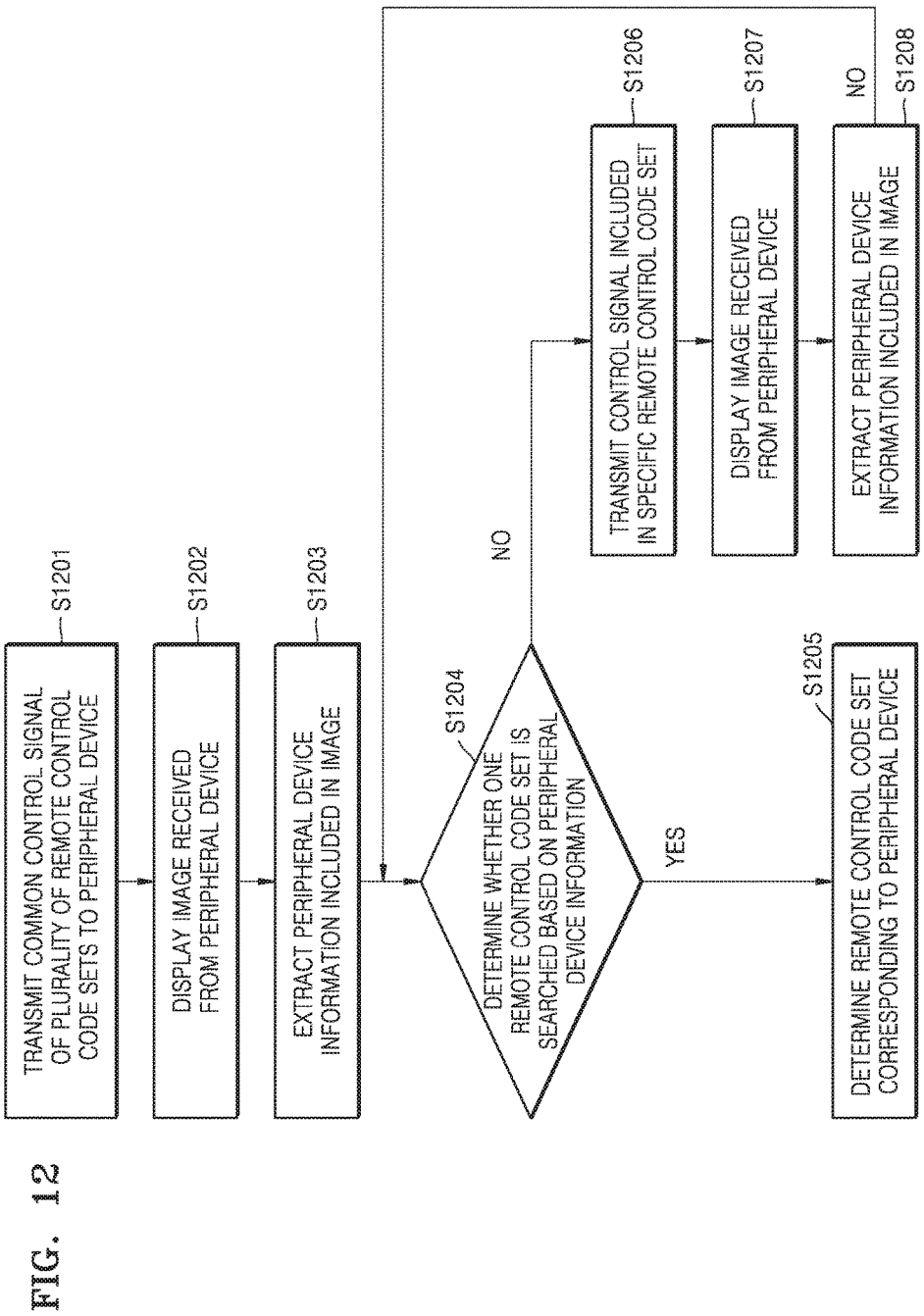
FIG. 12 is a flowchart for explaining an example of transmitting a control signal according to an example embodiment.

FIG. 12 is a flowchart for explaining an example of transmitting a control signal according to an example embodiment.

Figure 13:
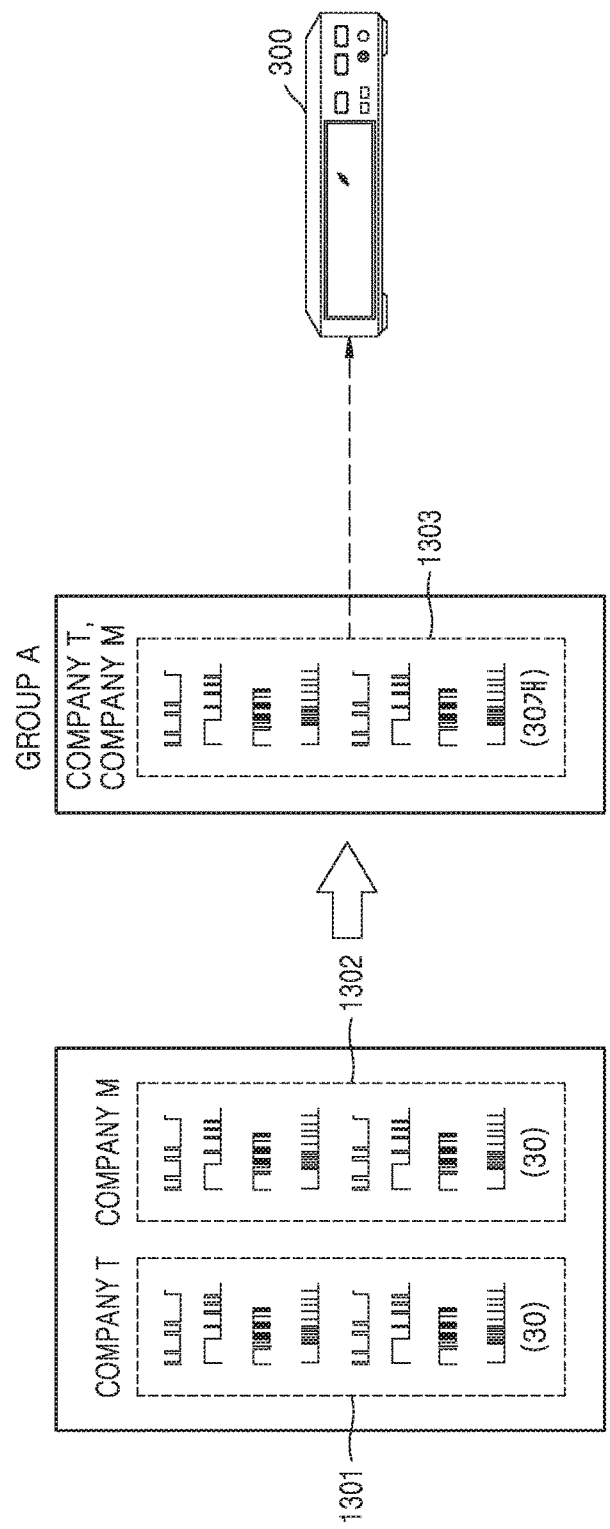
FIG. 13 is a view for explaining an example of transmitting a common control signal according to an example embodiment.
Figure 14:
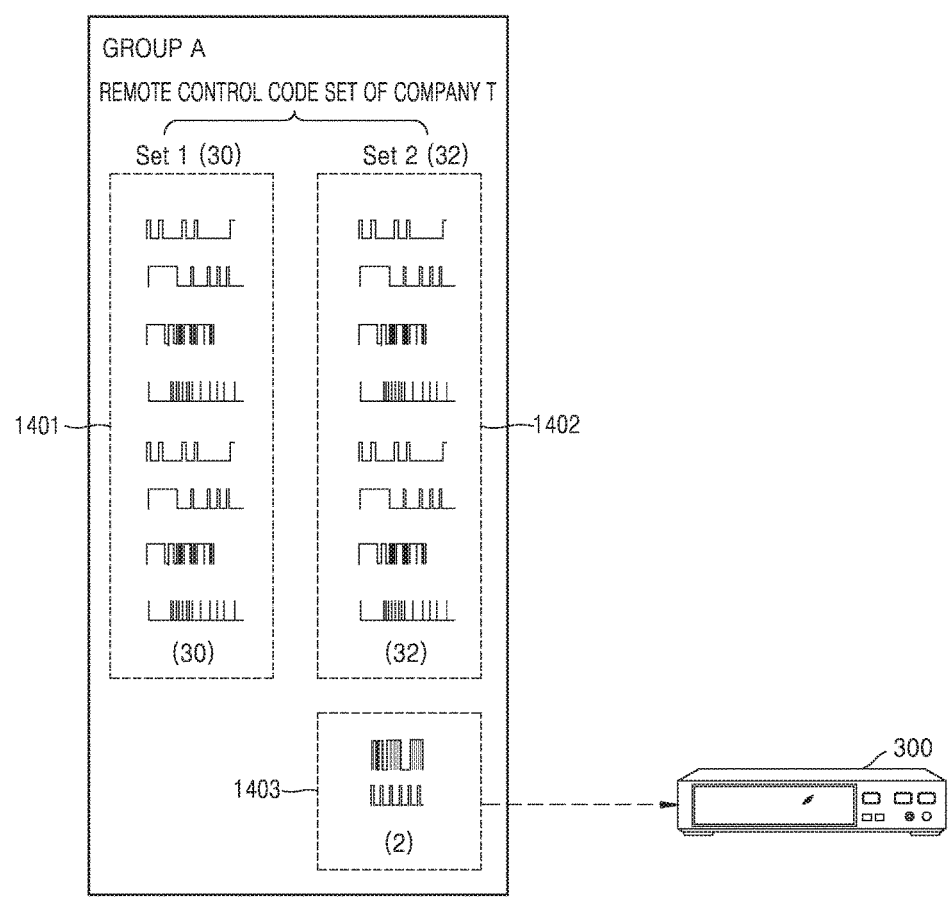
FIG. 14 is a view for explaining an example of using a control signal included in a specific remote control code set, according to an example embodiment.

FIG. 13 is a view for explaining an example of transmitting a common control signal according to an example embodiment. FIG. 14 is a view for explaining an example of using a control signal included in a specific remote control code set, according to an example embodiment. FIG. 12 will be described with reference to FIGS. 13 and 14.

In operation S1201, the image display device 100 may transmit a common control signal of a plurality of remote control code sets to the peripheral device 300 through the communicator 110.

According to an example embodiment, the controller 120 may select a group including the plurality of remote control code sets, and may transmit the common control signal included in the plurality of remote control code sets to the peripheral device 300.

According to an example embodiment, the controller 120 may not redundantly transmit an identical control signal common to the plurality of remote control code sets included in the group.

Referring to FIG. 13, for example, when a control signal 1301 of the broadcasting company T and a control signal 1302 of the broadcasting company M are the same, they may be classified into one group. The controller 120 may not individually transmit the control signal 1301 of the broadcasting company T and the control signal 1302 of the broadcasting company M classified into one group, but may transmit them as a common control signal 1303 to the peripheral device 300.

According to an example embodiment, an image recognition error that may occur when an identical control signal included in each remote control code set is redundantly transmitted may be prevented. For example, when an identical control signal is separately transmitted between each remote control code set, an image (e.g., a menu screen) is displayed in response to a first control signal. Furthermore, as an image (e.g., a menu screen) that has been displayed in response to a second control signal is turned off, an error may occur in an image analysis for extracting peripheral device information included in the image. According to an example embodiment, since a plurality of remote control code sets are classified into a group and a control signal common to the plurality of remote control code sets included in the group is not transmitted redundantly, it is possible to recognize an image more quickly and accurately. In operation S1202, the image display device 100 may display an image received from the peripheral device 300. According to an example embodiment, the image display device 100 may display the image received from the peripheral device 300 on the display 130 in response to a control signal transmitted to the peripheral device 300.

In operation S1203, the image display device 100 may extract peripheral device information included in the image. Detailed descriptions of operations S1202 and S1203 will not be given herein since they are described above with reference operations S504 and S505 in FIG. 5.

In operation S1204, the image display device 100 may determine whether one remote control code set is searched based on the peripheral device information. In operation S1205, when one remote control code set is searched based on the peripheral device information, the image display device 100 may determine the searched remote control code set as a remote control code set corresponding to a peripheral device.

Meanwhile, in operation S1206, when a plurality of remote control code sets are searched based on the peripheral device information, the image display device 100 may transmit a control signal included in a specific remote control code set.

For example, the image display device 100 may determine a manufacturer name as the peripheral device information based on a logo, text, and the like included in an image, and may search for a remote control code set corresponding to the manufacturer name of the peripheral device. When a plurality of remote controllers corresponding to an identical manufacturer name are searched, the controller 120 may repeat a process of re-transmitting the control signal.

According to an example embodiment, the controller 120 may use a remote control code set having a greatest number of control signals from among the searched plurality of remote control code sets. For example, if a plurality of remote control code sets are stored in the storage 140 corresponding to an identical manufacturer, there may be a remote control code set having a key related to an additional function in addition to a common control signal.

Referring to FIG. 14, when there are two remote control code sets of the broadcasting company T, a remote control code set SET1 and a remote control code set SET2 may include common control signals 1401 and 1402, and the remote control code set SET2 may further include a control signal 1403 corresponding to the additional function.

According to an example embodiment, the controller 120 may transmit the peripheral device 300 with the control signal 1403 corresponding to the additional function included in a specific set to. For example, the controller 20 may select SET1 or SET2 by transmitting the control signal 1403 corresponding to an additional function key of SET2 to the peripheral device 300.

In operation S1207, the controller 120 may display an image received from the peripheral device 300. According to an example embodiment, the image display device 100 may display the image received from the peripheral device 300 on the display 130 in response to a control signal transmitted to the peripheral device 300.

In operation S1208, the controller 120 may extract peripheral device information included in the image.

According to an example embodiment, the controller 120 may transmit the control signal 1403 of the SET 2 to the peripheral device 300, and when receiving an image in response to the control signal, and may determine SET2 among the plurality of remote control code sets of the broadcasting company T as a remote control code set corresponding to the peripheral device 300 based on the peripheral device information extracted from the image.

FIGS. 13 and 14 are views for explaining an example embodiment, but the present disclosure is not limited thereto.

A method of operating an image display device according to an example embodiment may be implemented as program commands which can be executed by various computer means, and recorded on a computer-readable medium. The computer-readable medium may include program commands, data files, data structures or a combination thereof. Program commands recorded on the medium may be particularly designed and structured for the present disclosure or available to those skilled in computer software. Examples of the computer-readable recording medium include magnetic media, such as a hard disc, a floppy disc, and a magnetic tape; optical media, such as a compact disc-read only memory (CD-ROM) and a digital versatile disc (DVD); magneto-optical media, such as floptical discs; a ROM; a RAM; and a flash memory. Program commands may include, for example, a high-level language code that can be executed by a computer using an interpreter, as well as a machine language code made by a complier.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An image display apparatus comprising:
   a memory configured to store a plurality of remote control code sets;
   a communicator configured to communicate with at least one peripheral device;
   a display; and
   a controller configured
      to classify the stored plurality of remote control code sets into at least one group, based on a plurality of control signals included in the plurality of remote control code sets,
      to select a group of the classified at least one group,
      to transmit a control signal, among the plurality of control signals, included in the selected group to a peripheral device connected to the image display apparatus through the communicator,
      to control the display to display an image received from the peripheral device in response to the transmitted control signal,
      to extract information about the peripheral device from the image, and
      to determine a remote control code set, among the stored plurality of remote control code sets, corresponding to the peripheral device, based on the extracted information.

2. The image display apparatus of claim 1, wherein the controller is further configured to classify the plurality of remote control code sets based on a common control signal included in the plurality of remote control code sets.

3. The image display apparatus of claim 1, wherein the controller is further configured to select the group of the at least one group based on usage frequency information of the group.

4. The image display apparatus of claim 1, wherein the controller is further configured to transmit a common control signal included in the plurality of remote control code sets of the selected group to the peripheral device.

5. The image display apparatus of claim 4, wherein the controller is further configured to not repeatedly transmit the common control signal of the plurality of remote control code sets to the peripheral device.

6. The image display apparatus of claim 1, wherein the memory is further configured to store the number of control signals included in each of the plurality of remote control code sets.

7. The image display apparatus of claim 1, wherein the controller is further configured to select a remote control code set having a greatest number of control signals from among the plurality of remote control code sets of the selected group, and to transmit the control signals included in the selected remote control code set to the peripheral device.

8. The image display apparatus of claim 1, wherein the controller is further configured to distinguish between a common control signal included in the plurality of remote control code sets and a control signal included in a specific remote control code set, in the selected group, and to transmit the control signal included in the specific remote control code set to the peripheral device.

9. The image display apparatus of claim 1, wherein the controller is further configured to transmit the control signal to a control device for controlling the peripheral device through the communicator, and to control the control device to transmit the control signal to the peripheral device.

10. The image display apparatus of claim 1, wherein the controller is further configured to detect at least one of a logo, a text, and an image included in the displayed image, and to extract the information about the peripheral device based on at least one of the detected logo, text, and image.

11. The image display apparatus of claim 1, wherein the information about the peripheral device comprises at least one of a manufacturer, a business name, and a model name of the peripheral device.

12. The image display apparatus of claim 1, wherein the controller is further configured to receive the plurality of remote control code sets from an external server through the communicator, and to store the received plurality of remote control code sets in the memory.

13. The image display apparatus of claim 1, wherein the control signal includes a signal for displaying the image on the display.

14. The image display apparatus of claim 1, wherein the controller is further configured to transmit the determined remote control code set to a control device for controlling the peripheral device through the communicator.

15. A method of operating an image display apparatus, the method comprising:
classifying a plurality of remote control code sets, stored in a memory, into at least one group, based on a plurality of control signals included in the plurality of remote control code sets;
selecting a group of the classified at least one group;
transmitting a control signal, among the plurality of control signals, included in the selected group to a peripheral device connected to the image display apparatus;
displaying an image received from the peripheral device in response to the transmitted control signal;
extracting information about the peripheral device from the image; and
determining a remote control code set, among the stored plurality of remote control code sets, corresponding to the peripheral device based on the extracted information.

16. The method of claim 15, wherein the classifying comprises:
classifying the plurality of remote control code sets based on a common control signal included in the plurality of remote control code sets.

17. The method of claim 15, wherein the selecting of the one group comprises:
selecting the group of the at least one group based on usage frequency information of the group.

18. The method of claim 15, wherein the transmitting of the control signal comprises:
transmitting a common control signal included in the plurality of remote control code sets of the selected group to the peripheral device.

19. The method of claim 18, wherein the transmitting of the control signal comprises:
not repeatedly transmitting the common control signal of the plurality of remote control code sets to the peripheral device.

20. A non-transitory computer-readable recording medium having recorded thereon a computer program for executing the method of claim 15.

* * * * *